Sept. 20, 1971  B. T. WILLIAMS ET AL  3,605,726
FLEXIBLE, EXTRA VASCULAR ELECTROMAGNETIC BLOOD FLOW PROBE
Filed April 14, 1969  2 Sheets-Sheet 1
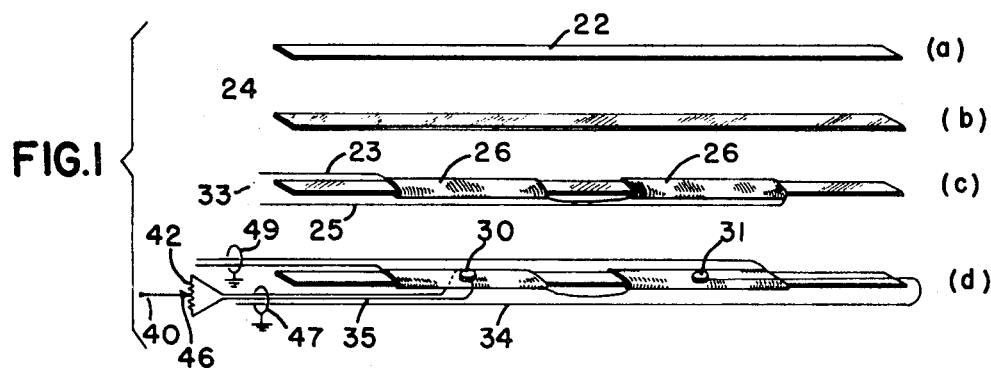
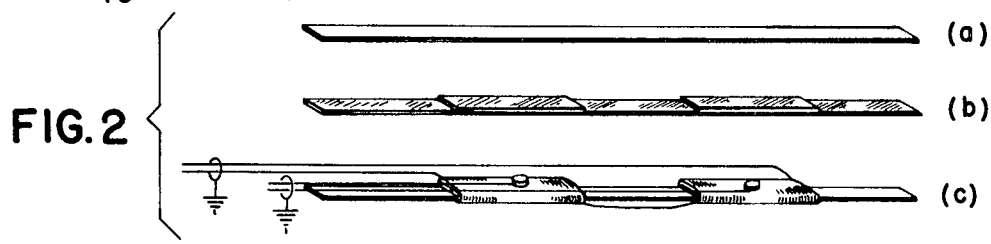
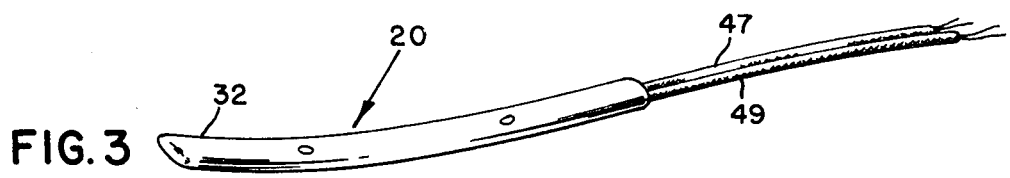
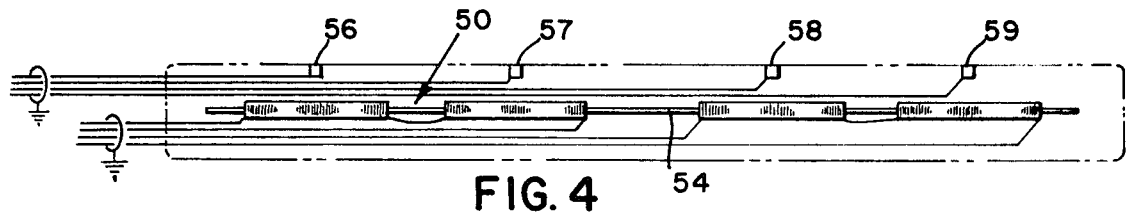
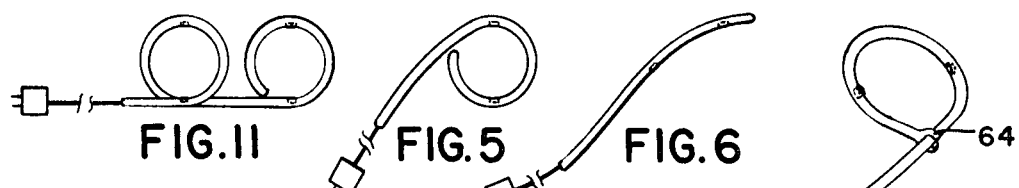
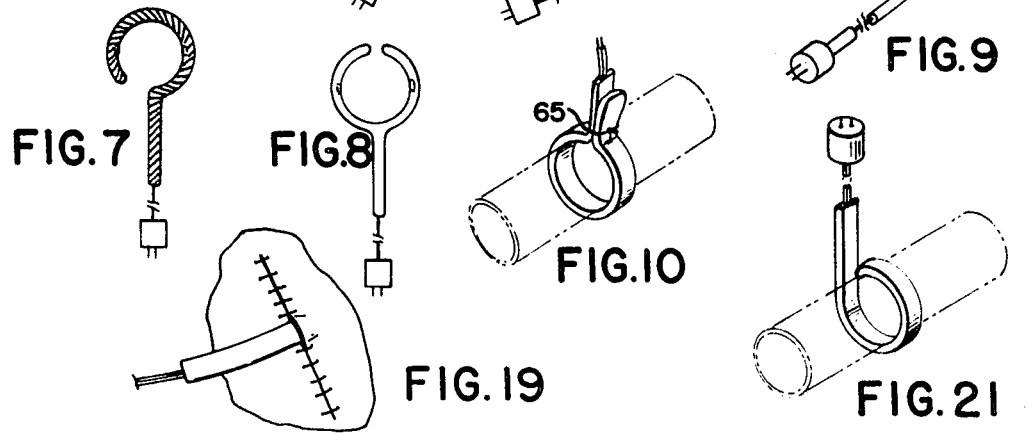

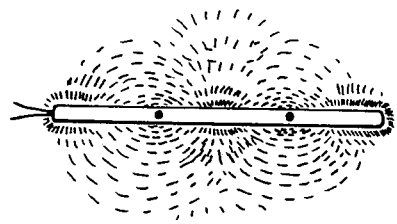
FIG.12
FIG.13
FIG.14
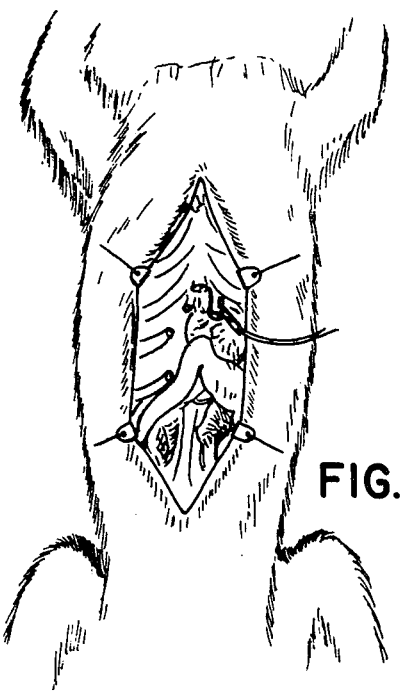
FIG.15
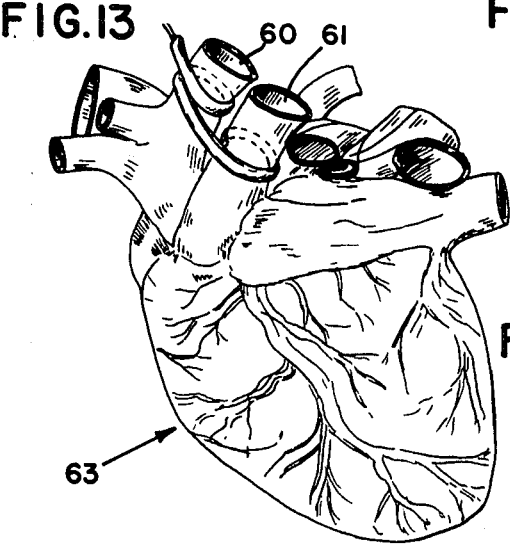
FIG.17
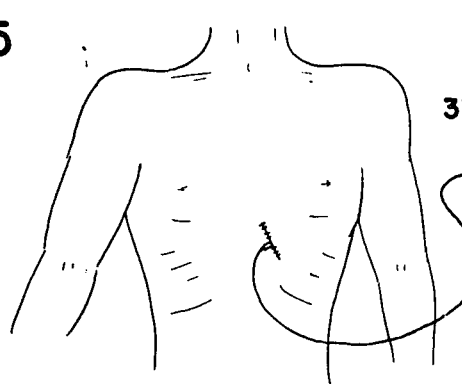
FIG.18
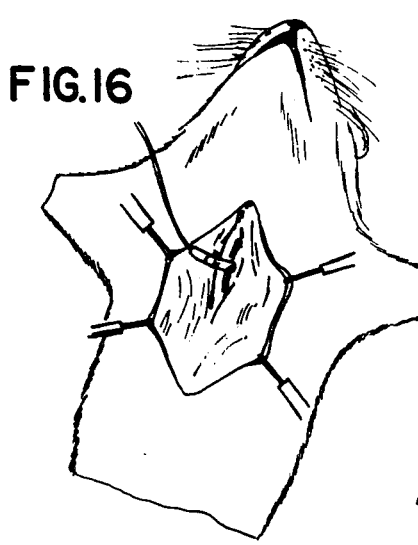
FIG.16
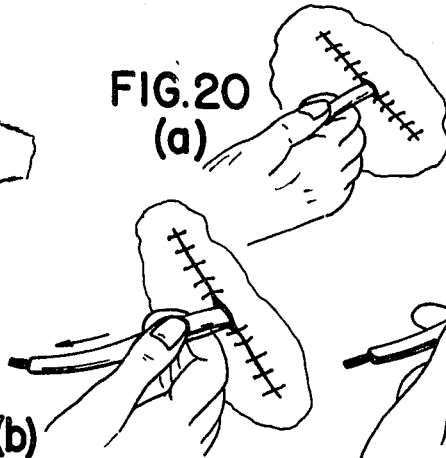
FIG.20(a)
FIG.20(b)
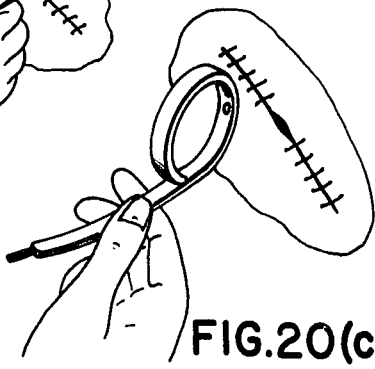
FIG.20(c)

United States Patent Office 3,605,726
Patented Sept. 20, 1971

3,605,726
FLEXIBLE, EXTRA VASCULAR ELECTROMAGNETIC BLOOD FLOW PROBE
Bryn T. Williams, 164 Dorchester Road, Kenmore, N.Y. 14217, and Charles A. Barefoot, 3800 Cash Drive, Winston-Salem, N.C. 27107
Filed Apr. 14, 1969, Ser. No. 815,918
Int. Cl. A61b 5/02
U.S. Cl. 128—2.05F
10 Claims

ABSTRACT OF THE DISCLOSURE

A flexible and non-surgically removable electromagnetic blow flow probe suitable for introduction into living creatures to measure relatively and quantitatively the velocity, volume or change of blood flow through selective blood vessels and organs. The probe is positioned at the time of surgery for use operatively and post-operatively, and because of its flexibility, size and shape, it can be removed from the living creature without further surgery. It is formed by enclosing a flux forming coil having cooperating electrodes for sensing a voltage generated by conductive blood with a flexible cover.

BACKGROUND, BRIEF SUMMARY AND OBJECTIVES OF THE INVENTION

The historical development of blood flow measurement utilizing electromagnetic blood flow probes has been set forth in U.S. Pats. Nos. 3,487,826 and 3,516,399, each patent covering an electromagnetic catheter blood flow probe. Further refinements of probe development are treated in several of the medical journals, and reference is made particularly to an article in the December 1959 issue of IRE Transactions on Medical Electronics by Drs. Spencer and Denison entitled "The Square-Wave Electromagnetic Fow Meter: Theory of Operation and Design of Magnetic Probes for Clinical and Experimental Applications."

Blood flow probes are constructed on the principle that the continuous recording of blood flow through blood vessels can be accomplished by the measurement of the electromotive force induced in blood flowing transverse to an established magnetic field. In the case of a substantially circular conduit, such as an artery or vein, the induced electromotive force is a linear function of the average fluid discharge. Where the conduit is itself conductive, it is possible, particularly where the conduit is a blood vessel, to detect flow signals by establishing electrical contact with two points on the outside wall of the vessel, preferably at the opposite ends of a diameter perpendicular to the magnetic field.
accomplished by including a ground electrode within the probe structure connecting to a common ground such as provided on the cooperating flowmeter which is a conventional electronic instrument for indicating flow in meaningful terms. Grounding often is accomplished by extending a ground lead to the subject and connecting with the common ground of the flowmeter.

The majority of currently employed blood flow probes are the extra-corporeal or extra-vascular type, the use of which requires that the body be surgically opened at the precise location where measurement is to be taken. While these existing probes are effective in providing operative and post-operative blood flow readings, post-operative applications are severely limited because the patient must be reopened to remove a probe which has been positioned to indicate flow over a period of several days. This post-operative procedure is undesirable. It is impractical to remove these extra-corporeal and extravascular probes without additional surgery because of their somewhat bulky and rigid construction.

Further developments led to the design of an intravascular catheter probe, two of which are disclosed in the previously noted patents which makes it unnecessary to expose the vessel at the site where flow measurement is to be taken. This probe can be introduced through a small incision at some remote, convenient place and pushed or passed through the vessel or vessels to the location where blood flow measurements are desired. The use of a catheter probe is limited to furnishing relative flow measurements unless the vessel cross-section is determined by fluoroscopy, X-rays or some other equally effective technique.

Current techniques in post-operative care of organ and reconstructive vascular surgery require immediate and more detailed blood flow information for the continuous surveillance of the patient's condition than can be provided using existing devices. The flexible and bendable probe disclosed herein was developed to meet this critical need. The probe constituting the present invention contains one or more coils preferably wound about one or more pliable cores and two electrodes positioned near the electromagnet formed from the coil or coils and core to collect the induced electromotive force. A flexible covering shrouds these components with only the electrodes exposed and allows the probe to be wound about the exterior periphery of a blood vessel or an organ. Because of its particular construction resulting in resiliency when encircling a vessel or organ, the probe annulus will yield slightly with pulsation, thus reducing the likelihood of erosion of the vessel wall. Probe components are designed and positioned so that a magnetic field is created at the location where the probe is fitted to the vessel. The cabled leads or conductors wired to the magnet and electrode assembly of the probe are connected with a conventional flow meter remote from the patient which is used to provide blood flow measurements.

Removal of an implanted probe from a surgically closed position is achieved by gentle traction on the outer protruding cable covering the leads extending from the probe to the flow meter, the flexibility of the covering and pliable magnet and electrode assembly permitting the probe to unwind from the vessel. The covering may be formed from silicone rubber or another equally suitable material and can be molded into a memory-retentive, linear, arcuate and substantially looped or circular configuration. The non-reactive nature of the covering material will prevent adhesion of the probe with body tissue and thus allow expeditious withdrawal of the probe from the patient.

In the broadest sense, the probe includes means for creating a magnetic field within a selective area of blood flow, electrodes for detecting the voltage induced when the conductive blood flows through the magnetic field, and a flexible covering insulating the electromagnet which creates the flux and maintaining the electrodes and the electromagnets in a substantially secure relationship.

From the foregoing discussion, it is apparent that a primary object of the present invention is to provide an electromagnetic blood flow probe which will contribute to quantitative and/or relative blood flow measurement.

Another object of the present invention is to provide an electromagnetic blood flow probe such as that described which can be removed from an implanted position in the body without surgically opening the body and exposing the vessel or organ with which the probe is associated.

A further object of the present invention is to provide an electromagnetic blood flow probe which is relatively thin, flexible and of a substantially consistent diameter which can be wound about blood vessels of varying diameters.

Yet another object of the present invention is to provide a blood flow probe which will permit the measurement of blood flow at locations within the body, which have been limited and inaccessible on many occasions because of the patient's anatomical condition.

Yet a further object of the present invention is to provide a blood flow probe which can be used for monitoring blood flow in organ transplants, venous and arterial grafts, atheroscelorsic vessel and the like.

Yet still a further object of the present invention is to provide a blood flow probe which can be substantially calibrated very quickly by comparison with a conventional, extra-corporeal or extra-vascular probe at the time of implanation.

These and other objects of the present invention will become more apparent from a consideration of the following detailed specification taken in conjunction with the accompanying drawings wherein like characters of reference designate like parts throughout the several views.

FIGURE DESCRIPTION

FIG. 1(a) through (d) is a sequential portrayal of the construction of one embodiment of the electromagnetic probe comprising the present invention wherein a flexible steel strip forming the core of the electromagnet is insulated, wound with a number of turns of insulated wire to form a coil, and provided with voltage sensing electrodes along one surface.

FIG. 2(a) through (c) is a sequential portrayal of the construction of another, equally effective embodiment of the electromagnetic probe constituting the subject matter of the present invention.

FIG. 3 is a perspective view of a relatively thin and flat embodiment of a flexible probe which may be formed by either of the construction techniques shown in FIG. 1 or 2.

FIG. 4 is a tandem employing the principles of the present invention which is formed by positioning two probes such as disclosed in FIGS. 1, 2 or 3 in tandem for specific applications involving flow measurement in adjacent and closely located vessels.

FIG. 5 is one variation of the probe of the present invention wherein the flexible covering for the probe is shaped or molded into a variable, memory-retentive loop.

FIG. 6 is an arcuately fashioned probe suitable for use in special applications wherein total encirclement of a vessel or organ is unnecessary.

FIG. 7 is another variation of a memory-retentive loop for the probe of the present inventon.

FIG. 8 is yet another variation of a loop formation for the probe of the present invention.

FIG. 9 is a fashioned loop with disengageable securing means extending from the forward end of the probe that will fasten to the probe cable and insure its sustained encirclement about the vessel or organ.

FIG. 10 illustrates yet another technique for securing the probe about a vessel exterior.

FIG. 11 is one configuration of the tandem probe illustrated in FIG. 4.

FIG. 12 is a flux diagram illustrating the flux field about the probe when it extends in substantially a straight line.

FIG. 13 is a flux diagram illustrating the flux field resulting when the probe is formed into a loop.

FIG. 14 is a flux diagram illustrating the flux field formed when the probe is arcuately positioned.

FIG. 15 is a perspective, fragmentary view of one embodiment of the probe constituting the present invention positioned about a blood vessel within a surgically opened dog.

FIG. 16 is a perspective, fragmentary view of another variation of the probe constituting the present invention applied to a surgically exposed artery of a rat.

FIG. 17 is a perspective, fragmentary and isolated view of the tandem probe illustrated in FIGS. 4 and 11 applied to adjacent blood vessels of a heart so that simultaneous blood flow readings are obtained.

FIG. 18 is a perspective, fragmentary view of an implanted probe comprising the present invention and its connection from a subject to a remotely located flow meter where blood flow readings are reflected.

FIG. 19 is an enlarged view of an implanted probe constituting the subject of the present invention shown in FIG. 18.

FIG. 20(a) through (c) is a sequential portrayal of the withdrawal of an electromagnetic probe constituting the present invention from an implanted, surgically closed position.

FIG. 21 illustrates the probe of FIG. 5 positioned about a blood vessel.

DETAILED DESCRIPTION OF THE INVENTION

Referring now to the drawings and particularly to FIG. 3 disclosing one embodiment of the present invention, a flexible and substantially flat electromagnetic probe generally designated 20 is provided for positioning around or against an arcuate or circular surface as desired. The probe may be constructed by insulating a flexible core 22 (FIG. 1) with an appropriate non-conductive coating 24 and then winding an insulated electrical conductor about the core to form one or more coils 26 which may be separated or split in a manner such as shown in FIG. 1(c). Voltage sensing electrodes 30 and 31 are positioned on the interior surface of the coils 26 to make direct electrical contact with the walls of a blood vessel. Extremely good results are obtained by the use of gold electrodes though obviously any other suitable conductor may be used.

After the electrodes 30 and 31 have been positioned proximate the coil or coils, a flexible covering 32 formed from silicone rubber or some other similar and suitable material is bonded over the electrical components with only the electrodes exposed to insulate and seal as well as hold these elements in a substantially fixed relationship each with the other. This covering 32 can be molded to preshape the probe in any number of memory-retentive configurations such as are illustrated in FIGS. 5, 6, 7, 8 and 9 which are extremely important as will be illustrated subsequently.

Current-carrying conductors 23 and 25 which form the coil 26 extend to a power source 33 as shown in FIG. 1 so that energization will create a magnetic field about the coil 26. Additional conductors 34 and 35 extend from each electrode 31 and 30 to the flow meter 37 (see FIG. 18) which will respond to the voltage induced by the blood flow and translate this induced voltage into a meaningful blood flow reading.

A voltage is induced in a conductor whenever a conductor is moved across a magnetic field, and conversely, there is a similar occurrence when the magnetic field is moved across a conductor. It is this relative motion between field and conductor that produces self-induced voltage in a conductor. Thus blood flow measurement depends upon the induction of voltage in blood flowing in a magnetic field, and the voltage will be induced at right angles to the direction of motion and to the magnetic field, the induced voltage polarity depending upon the polarity of the field and the direction of the conductor's motion. The induced voltage is determined by the velocity of motion, the strength of the field and the length of the conductor, and when blood velocity and vessel size are known, volumetric blood flow calculations can be made or read directly from calibrated equipment.

The flux diagrams of FIGS. 12, 13 and 14 illustrate the concentrated lines of flux, some of which are positioned perpendicular to the flow of blood in the vessels or organs, and these fields make it apparent that the probe of the present invention is adaptable for use in a variety of locations. Because of the nature of the field, it is not necessary that the probe be completely encircled about the periphery of a vessel. It need only continuously contact the vessel at least between the electrodes 30 and 31 which are positioned against the wall of the vessel or organ.

Flow meters often sense voltage signals caused by the probe acting as a transformer when the alternating magnetic field energization takes place. The signals are sometimes picked up by the electrodes and mingled with the induced voltage caused by blood flow. This pseudo flow signal is an annoyance because it is often difficult and, in many instances, impossible to distinguish from real flow readings. This is commonly called the transformer effect.

In an effort to balance out the unwanted signal created by this transformer effect, it has been found appropriate to connect two leads like those designated in FIG. 1(d) as 34 and 35 which eventually form one electrode conductor 40 to the signal electrode 30 (FIG. 1(d)) between which is inserted a variable resistor indicated generally as 42. When a probe is flow meter-connected and positioned about a blood vessel for readings, it is necessary that no initial potential difference exist between the electrodes 30 and 31 so that a true blood flow reading resulting from only the fluid flow through the magnetic field can be obtained. The variable resistor 42 has its wiper 46 extending to form the electrode lead 40 and allows any unwanted initial potential difference between the electrodes 30 and 31 to be balanced out by an appropriate IR drop across a selected value of the resistor. This establishes a zero or no-potential reference upon which accurate blood velocity and flow readings may be based. The various conductors extending from the electrodes 30 and 31 and coil 26 for eventual connection with the power source 33 and flow meter 37 are preferably enclosed in shielded cables 47 and 49 which are, in turn, grounded to avoid stray signal pick up and insure accurate readings, the conductors 23 and 25 of the coil 26 contained in one cable 49 and the electrode leads 34 and 35 placed within a separate shielded cable 47.

In certain instances, it is most desirable to monitor simultaneously blood flow readings in two blood vessels in close proximity, whether it be to compare blood flowing to and from an organ or to combine blood flow in two separate vessels to provide a total blood flow in a single direction. For this particular purpose, the tandem proble illustrated in FIGS. 4 and 11 has been designed. This probe is shown diagrammatically in FIG. 4 and is formed from two probes like the single probe embodiment discussed previously. First and second electrode magnets 50 and 52 may be mounted on separate cores or a common core 54 as shown and are situated adjacent electrodes 56, 57 and 58, 59 as illustrated. The probe formed is capable of providing two blood flow readings from a single implantment of the tandem probe. The flexible covering 60 can be molded in any memory-retentive configuration, one such arrangement being suggested in FIG. 11.

A most important application for the tandem probe is illustrated in FIG. 17 wherein the blood flow in the ascending aorta 60 and main pulmonary artery 61 (which are physically located extremely close each to the other) of the heart 63 can be measured by one implanted probe. The flexible nature of the probe allows its positioning about these vessels of varying size whose close proximity might very well limit the use of conventional extra-vascular probes.

The removal of an implanted probe constituting the present invention without surgery is illustrated in FIG. 20(a) through (c) wherein a probe such as described has been implanted within a human body atfer which the incision has been closed. Removal of the probe is achieved, not by reopening the previously closed incision, but by a gentle traction on the outer end of the probe wherein the flexible covering will allow it to unwind from the vessel and be withdrawn without any reopening of the previous incision. The characteristics of the material of the covering make the probe's removal effortless, and this characteristic coupled with the natural tendency of the body to form a sheath around any foreign body implanted therein makes this instrument an extremely important prognostic and/or diagnostic tool. Additionally, the substantially uniform diameter of the total probe eliminates withdrawal being restricted by the incision closing sutures.

FIGS. 15 and 16 illustrate the implantation of probes embodying the present invention in animals such as dogs and rats, and it will be obvious that the flexible nature of the probe itself will allow implantation and encirclement of a variety of organs or vessels in living creatures.

In the event it is desired that the probe completely encircle the vessel for blood flow measurement, the probe embodiments illustrated in FIGS. 5, 9 and 10 are suitable for insuring this physical accomplishment. The probe in FIG. 9 has a flexible clamp 64 suitable for encircling the cable portion of the probe but not to the extent that a gentle tugging or twisting of the probe at the connecting cable would prevent removal of the implanted instrument. FIG. 10 illustrates yet another technique for securing the probe by means of a suture 65 which will dissolve within a predetermined period of time or remain intact depending on the particular characteristics of the material used. On dissolution of the suture, if such is desired, the probe can be withdrawn from the patient by pulling gently the protruding cable. The non-reactive, non-toxic, flexible characteristic of the probe covering will allow it to yield with pulsation of the vessel or organ and thus minimize any decay or erosion of the vessel wall which is sometimes experienced with conventional, extra-vascular probes. The flexible covering formed by molding a rubbery substance about the probe components may be replaced by a pre-formed tubing having pre-set memory-retentive characteristics with no loss in efficiency or effectiveness of the probe.

Because of the body's natural tendency to form a protective sheath about any foreign object placed therein, it is possible to substitute or replace an implanted probe with another such probe of substantially equal size as the formed sheath provides a passageway or channel within which the probe can slide for insertion. This becomes a most desirable characteristic in the event the initially implanted probe becomes defective for any reason. It is contemplated that a flexible guide wire incorporated within the body of the probe might be extended slightly as desired to direct the insertion of a second probe in the event the first implanted probe is removed for one reason or another.

It is contemplated also that the probe embodying the present invention may be provided with a small passageway or channel through which chemical or physical means might be passed to change the memory-retentive characteristics of the molded covering in the event that becomes desirable after implantation. This change might be desirable for any number of reasons so that the probe molding can become softer or firmer as the particular circumstances require. The passageway may terminate in a lumen of a predetermined size for inserting or removing fluids or for determining pressure at a given location.

As a further alternate approach, a preset and shaped material may be embodied with or as the magnet core to provide additional memory-retentiveness for the probe.

The versatility of the present invention is obvious because of the many applications available due to its flexible nature, memory-retentiveness, size and configuration. It is apparent that many modifications and variations may be made in the construction and arrangement of the electromagnet, the electrodes, the flexible body covering, and the coil design as well as other phases of the present inventive concept in light of the above teachings without departing from the real spirit and purpose of the invention. Such modifications are contemplated and are considered as being within the scope of the appended claims.

What is claimed is:

1. A flexible, non-surgically removable extra vascular electromagnetic probe for detecting the voltage induced by current-conducting blood moving within a blood vessel, said probe comprising: flexible means creating a field of flux within a selected area of blood flow; electrode means detecting the voltage induced when conductive blood flows through the flux field; flexible covering means surrounding said flux creating means and maintaining said electrode means and said flux creating means in a preselected relationship each with the other; and means for releasably retaining said flexible covering means and said electrode means and flux creating means around and in extra vascular contact with the exterior surface of the blood vessel, said flexible flux creating means including an electromagnet having at least one bendable insulated wire coil.

2. A probe as claimed in claim 1, said releasably retaining means including a flexible clamp.

3. A flowmeter including the probe as claimed in claim 1 in combination with means indicating the induced voltage.

4. A probe as claimed in claim 1, said flux creating means including an electromagnet having at least one flexible metallic substantially rectilinear core and at least one continuous coil comprising a number of turns of insulated wire conforming continuously with said flexible core.

5. The combination as claimed in claim 3 further comprising an electrical power source; first current carrying means secured from said power source to said flux creating means; second current carrying means connecting said electrode means to said indicating means transmitting voltage signals proportional to the velocity of blood passing through said flux field; and cable means enclosing said current carrying means, the circumference of cable means being substantially equal to the circumference of said covering means.

6. The combination as claimed in claim 5, said second current carrying means including potential balancing means selectively compensating for unwanted induced potential and establishing a zero potential reference.

7. A probe as claimed in claim 1, said releasably retaining means formed by said flexible covering means normally retaining said flux creating means and said electrode means in a continuous extendible loop suitable to encircle the exterior periphery of a blood vessel.

8. A probe as claimed in claim 1, said releasably retaining means including a suture dissolvable within a predetermined period of time.

9. A probe as claimed in claim 2, said flux creating means including first and second electromagnets having at least one flexible metallic substantially rectilinear core and first and second continuous coils each comprising a number of turns of insulated wire conforming continuously with said first and second flexible cores respectively.

10. A flowmeter as claimed in claim 3 further comprisnig an electrical power source; first current carrying means connected from said power source to said flux creating means; second current carrying means connecting said electrode means to said indicating means transmitting voltage signals proportional to the velocity of blood passing through said flux field; and cable means enclosing said current carrying means, the circumference of said cable means being substantially equal to the circumference of said covering means, said second current carrying means including potential balancing means selectively compensating for unwanted induced potentials and establishing a zero potential reference.

References Cited

UNITED STATES PATENTS 3,405,708  10/1968  Webster, Jr. _____ 128—2.05(F)

OTHER REFERENCES

Kolin, "Proceedings of the National Academy of Sciences," vol. 57, May 1967, pp. 1331–1337 (128/2.05F).

WILLIAM E. KAMM, Primary Examiner

U.S. Cl. X.R.

73—194EM